United States Patent
Moteki (10) Patent No.: US 11,394,037 B2
(45) Date of Patent: Jul. 19, 2022

(54) CONVEYING APPARATUS FOR SEPARATOR FOR FUEL CELL

(71) Applicant: TOYOTA JIDOSHA KABUSHIKI KAISHA, Toyota (JP)

(72) Inventor: Kazunari Moteki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 202 days.

(21) Appl. No.: 16/571,504

(22) Filed: Sep. 16, 2019

(65) Prior Publication Data
US 2020/0106112 A1 Apr. 2, 2020

(30) Foreign Application Priority Data
Oct. 2, 2018 (JP) .............................. JP2018-187640

(51) Int. Cl.
| | | |
|---|---|---|
| H01M 8/0247 | (2016.01) | |
| B65G 49/06 | (2006.01) | |
| H01M 8/2404 | (2016.01) | |
| H01M 8/0271 | (2016.01) | |
| B65G 59/04 | (2006.01) | |
| B65G 59/02 | (2006.01) | |

(52) U.S. Cl.
CPC ........ *H01M 8/0247* (2013.01); *B65G 49/068* (2013.01); *B65G 59/02* (2013.01); *B65G 59/04* (2013.01); *B65G 59/045* (2013.01); *H01M 8/0271* (2013.01); *H01M 8/2404* (2016.02)

(58) Field of Classification Search
CPC .............................. B65G 59/04; B65G 59/045
See application file for complete search history.

(56) References Cited

U.S. PATENT DOCUMENTS

| | | | |
|---|---|---|---|
| 6,682,065 B2 * | 1/2004 | Leonardo ................ B65B 41/06 | |
| | | | 271/104 |
| 10,479,619 B2 * | 11/2019 | Mochizuki ........... B65G 47/918 | |
| 2009/0252996 A1 | 10/2009 | Nomoto et al. | |
| 2010/0228388 A1 | 9/2010 | Ago et al. | |
| 2013/0241135 A1 | 9/2013 | Horiuchi | |

FOREIGN PATENT DOCUMENTS

| | | |
|---|---|---|
| DE | 10122483 A1 | 11/2002 |
| JP | 2007-115600 A | 5/2007 |
| JP | 2010-168138 A | 8/2010 |
| JP | 2010-207858 A | 9/2010 |
| JP | 2012-146679 A | 8/2012 |
| JP | 2013-189317 A | 9/2013 |
| JP | 2013-249200 A | 12/2013 |
| JP | 2017-052654 A | 3/2017 |
| WO | 2007045951 A2 | 4/2007 |

* cited by examiner

*Primary Examiner* — Jonathan Crepeau
(74) *Attorney, Agent, or Firm* — Dickinson Wright, PLLC (57) ABSTRACT

A conveying apparatus for a separator for a fuel cell includes: a conveying portion configured to hold an intermediate part of the separator and lift the separator; and restricting portions configured to restrict the opposite ends of the separator to warp the intermediate part of the separator in the lifting direction when the conveying portion lifts the separator. The restricting portions are configured to release the opposite ends when the intermediate part of the separator warps in the lifting direction with a target curvature amount.

4 Claims, 4 Drawing Sheets

CONVEYING APPARATUS FOR SEPARATOR FOR FUEL CELL

INCORPORATION BY REFERENCE

The disclosure of Japanese Patent Application No. 2018-187640 filed on Oct. 2, 2018 including the specification, drawings and abstract is incorporated herein by reference in its entirety.

BACKGROUND

1. Technical Field

This disclosure relates to a conveying apparatus for a separator for a fuel cell.

2. Description of Related Art

The disclosure related to a separator constituting a part of a fuel cell, a conveying method of the separator, and a conveying apparatus for the separator has been known (see Japanese Unexamined Patent Application Publication No. 2007-115600 (JP 2007-115600 A)). In some cases, a bead-shaped sealing portion for sealing a gas passage or a fluid manifold is formed on one surface or both surfaces of a separator. In this case, when the sealing portion is crushed due to deadweight of stacked separators, a tacking force is generated, so that the separators adhere to each other. This causes a state where a separator adsorbed to an adsorption pad adheres to another separator, so that several separators may be conveyed at the same time (see [0004] and so on).

An object of the disclosure described in JP 2007-115600 A is that fuel cell separators temporarily stacked are more surely conveyed one by one in the fuel-cell manufacturing process or the like that has the above problem. In order to achieve the above object, JP 2007-115600 A describes the disclosure related to a conveying method in which stacked fuel cell separators are adsorbed and conveyed one by one, the conveying method including a step of supplying a medium to a gap between adjacent separators so as to separate the separators from each other (see claim 1 and so on in JP 2007-115600 A).

In the disclosure of JP 2007-115600 A, when a medium such as air or other gases is supplied to the gap between the separators, e.g., a gap formed by a sealing portion provided in a projecting manner on one surface or both surfaces of each of the separators, for example, a pressure in the gap increases. Hereby, the separators adjacent to each other are separated from each other (see [0007] and so on in JP 2007-115600 A).

SUMMARY

In the conveying method, the separators adjacent to each other are separated from each other by just supplying the medium such as the air or other gases. However, when a supply amount of the medium to separate the separators from each other is large, this can cause an increase of a manufacturing cost of the separators.

This disclosure provides a conveying apparatus for a fuel cell separator (a separator for a fuel cell) at a low cost, and the conveying apparatus can convey a plurality of separators stacked via sealing portions one by one.

One aspect of the disclosure relates to a conveying apparatus for conveying a separator for a fuel cell, the separator including a sealing portion. The conveying apparatus includes a conveying portion configured to hold an intermediate part of one separator and lifts the one separator, and restricting portions configured to restrict opposite ends of the one separator to warp the intermediate part of the one separator in the lifting direction when the one separator is lifted by the conveying portion. The restricting portions are configured to release the opposite ends when the intermediate part of the one separator warps in the lifting direction with a target curvature amount.

The separator for the fuel cell may be, for example, a generally rectangular plate-shaped member formed by using, as a material, an elastic body including metal such as stainless steel or titanium. The fuel cell is configured such that a membrane-electrode-gas diffusion layer assembly (MEGA) is disposed between two separators, for example. The separator includes a sealing portion on at least one surface.

The sealing portion may be disposed in a peripheral portion of the separator or around a through-hole provided in the separator. When a fuel cell stack is formed by stacking a plurality of fuel cells, the sealing portion seals a passage for a reactant gas or a passage for a refrigerant, so as to prevent the leak of the reactant gas or the refrigerant. The material of the sealing portion is resin including rubber such as ethylene propylene diene rubber (EPDM) or silicone rubber, for example.

In a manufacturing process of the fuel cell, the separators may be stacked via the sealing portions. In this case, respective sealing portions of two separators adjacent to each other make close contact with each other or the sealing portion of one of the two separators makes close contact with a part of the other one of the two separators, the part being other than the sealing portion, so that the two separators can be hardly separated from each other. That is, an adhesive force or a tacking force due to the sealing portion is generated between the two separators adjacent to each other, thereby making it difficult for the two separators adjacent to each other to be separated from each other.

As described above, for example, the conveying apparatus of the present aspect conveys a plurality of separators stacked via the sealing portions one by one. The conveying apparatus holds an intermediate part of one separator put on the top of the stacked separators, by means of the conveying portion, for example. More specifically, in a case where the separators have a generally rectangular plate shape, the conveying portion may hold the intermediate part of the one separator in its longitudinal direction.

For example, the conveying portion may include vacuum-adsorption portions configured to hold the intermediate part of the separator by vacuum adsorption, or fingers configured to grip the intermediate part of the separator. Note that the configuration of the conveying portion is not particularly limited, provided that the conveying portion can hold the intermediate part of the separator and can lift and convey the separator. The lifting direction of the separator by the conveying portion may be the upper side in the vertical direction, for example. In the following description, the upper side and the lower side in the lifting direction of the separator may be just referred to as the "upper side" and the "lower side" in some cases.

The restricting portions are provided independently from the conveying portion. The restricting portions temporarily restrict the opposite ends of the separator to warp the intermediate part of the separator upward when the conveying portion lifts the separator. Further, the restricting portions are configured to release the opposite ends of the separator by relieving the restriction on the opposite ends of the separator when the intermediate part of the separator warps upward with the target curvature amount. Here, the target curvature amount is a distance between the opposite ends and the intermediate part in the lifting direction just before the opposite ends of the separator warping in an arch shape are released.

That is, in a state where the opposite ends of the separator are restricted by the restricting portions, only the intermediate part of the separator is lifted upward by the conveying portion, and hereby, the separator curves to project upward so that the separator warps to bend into an arch shape within an elastic range. After that, when the intermediate part of the separator warps with the target curvature amount, the restriction on the opposite ends by the restricting portions is relieved. Consequently, the opposite ends of the separator jump upward due to the elasticity of the separator.

Hereby, one separator can be pulled off against the adhesive force or the tacking force by the sealing portion and conveyed by the conveying portion. Further, at the time of pulling off one separator, it is not necessary to supply a medium such as air or other gases, or it is possible to markedly reduce the supply amount of the medium as compared with the conveying apparatus of JP 2007-115600 A. On this account, in comparison with the conveying apparatus of JP 2007-115600 A, it is possible to largely reduce the cost.

The restricting portions may be projections provided to face each other at an interval equivalent to a dimension between the opposite ends when the intermediate part of the separator warps with the target curvature amount.

With this configuration, when the conveying portion lifts the separator, the restricting portions can temporarily restrict the opposite ends of the separator to warp the intermediate part of the separator upward. Further, with this configuration, the restricting portions can release the opposite ends by relieving the restriction on the opposite ends when the intermediate part of the separator warps upward with the target curvature amount.

More specifically, the interval between the restricting portions facing each other is narrower than a dimension between the opposite ends of the separator in a state where the intermediate part of the separator is not lifted by the conveying portion and the separator does not warp. On this account, when the restricting portions are disposed above the separator, the restricting portions face the opposite ends of the separator in the lifting direction of the separator.

In this state, when the intermediate part of the separator is held by the conveying portion to lift the separator, the opposite ends of the separator are temporarily restricted by the restricting portions, so that the intermediate part of the separator warps upward. As the intermediate part of the separator is further lifted by the conveying portion, the warp of the separator the opposite ends of which are restricted by the restricting portions becomes large. At the same time, the dimension between the opposite ends of the separator gradually decreases.

Then, when the intermediate part of the separator warps upward with the target curvature amount, the dimension between the opposite ends of the separator is equivalent to the interval between the restricting portions. This allows the separator to pass through between the restricting portions facing each other, so that the restriction on the opposite ends of the separator by the restricting portions is relieved. When the opposite ends of the separator warping in an arch shape are released, the opposite ends of the separator jump upward. Hereby, one separator can be pulled off against the adhesive force or the tacking force by the sealing portion and conveyed by the conveying portion.

Note that the target curvature amount with which the intermediate part of the separator is held and warped by the conveying portion is set to a position at which one separator can be pulled off against the adhesive force or the tacking force by the sealing portion when the opposite ends of the one separator are released to jump up. That is, in a case where one separator does not warp so much, when the opposite ends of the one separator are released to jump up, the one separator might not be pulled off.

In the meantime, in a case where the separator warps too much, the separator might be damaged, or lifting or conveying of the separator by the conveying portion might be difficult. On this account, the target curvature amount with which the intermediate part of one separator warps can be set to a curvature amount with which the intermediate part can warp appropriately so that the one separator can be pulled off against the adhesive force or the tacking force of the sealing portion when the opposite ends of the one separator jump up.

The restricting portions may include inclined portions inclined to respective directions toward the intermediate part from the opposite ends of the separator as the inclined portions go from the lower side to the upper side in the lifting direction of the separator.

With this configuration, it is possible to easily warp the separator the opposite ends of which are restricted by the restricting portions, to prevent the damage on the separator, and to smoothly relieve the restriction on the opposite ends of the separator. That is, in a case where the restricting portions do not include the inclined portions, when the intermediate part of the separator is lifted, the restricting portions might restrict the opposite ends excessively, bite into the opposite ends, or prevent the release of the opposite ends, depending on the shape of the restricting portions as projections. On the other hand, when the restricting portions include the inclined portions, it is possible to restrain such a trouble.

Note that the conveying apparatus according to the one aspect is not limited to the configuration in which the restricting portions are projections. More specifically, the restricting portions may be an openable gripper configured to restrict and release the opposite ends of the separator by opening and closing. Further, the restricting portions may be retractable detent portions or fingers configured to restrict and release the opposite ends of the separator by advancing and retreating with respect to the opposite ends of the separator. As such, even if the restricting portions are not projections, the restricting portions can temporarily restrict the opposite ends of the separator so as to warp the separator, and when the intermediate part of the separator warps with the target curvature amount, the restricting portions can release the opposite ends.

Further, the conveying apparatus according to the one aspect may include a gas supply portion configured to blow gas toward the intermediate part from the outside of a plurality of stacked separators. The gas supply portion may be disposed above the restricting portions in the lifting direction of the separator to be lifted by the conveying portion.

With this configuration, when the opposite ends of the separator warping in an arch shape are released from the restriction of the restricting portions and the opposite ends of the separator jump upward, the gas can be blown to the lower side of the separator. Hereby, the pulling-off of the separator by jump of the opposite ends of the separator can be assisted, promoted, and facilitated by the gas.

Accordingly, the target curvature amount to warp the intermediate part of the separator can be reduced, the warp of the separator can be reduced, the load to the conveying portion can be reduced, and the damage to the separator can be restrained. Further, the supply of the gas by the gas supply portion is to assist, promote, and facilitate the pulling-off of the separator by the jump of the opposite ends of the separator. On this account, in comparison with a case where adjacent separators are separated from each other by just supplying a medium such as the air or other gases like the conveying apparatus described in JP 2007-115600 A, it is possible to largely reduce the supply amount of the gas, thereby making it possible to reduce the cost.

The gas supply portion may be provided, in the lifting direction of the separator, in the vicinity of the position of the intermediate part at the time when the intermediate part warps with the target curvature amount.

With this configuration, the gas supply portion can be disposed below, in the lifting direction of the separator, the opposite ends of the separator that jump up when the opposite ends of the separator warping in an arch shape are released from the restriction of the restricting portions. Hereby, it is possible to more surely blow the gas to the lower surface of the separator when the opposite ends of the separator jump upward in the lifting direction of the separator. Note that the vicinity of the position of the intermediate part is within a range having tolerances of about a few millimeters toward the upper side and the lower side in the lifting direction of the separator from the position of the intermediate part as a center, for example.

In terms of the lifting direction of the separator, the gas supply portion may be provided between upper ends of the restricting portions and a jump position to which the opposite ends of the separator jump up when restriction on the opposite ends is relieved.

With this configuration, the gas supply portion can be disposed below, in the lifting direction of the separator, the jump position of the opposite ends of the separator when the opposite ends of the separator warping in an arch shape are released from the restriction of the restricting portions. Hereby, it is possible to more surely blow the gas to the lower surface of the separator when the opposite ends of the separator jump upward in the lifting direction of the separator.

Further, the conveying apparatus according to the above aspect may further include a gas controlling portion configured to control blow-off of the gas by the gas supply portion. The gas controlling portion may be configured to control the gas supply portion to blow the gas at least after the restriction on the opposite ends of the separator is relieved but before the opposite ends reach the jump position.

That is, the gas controlling portion may be configured to control the gas supply portion to keep blowing the gas regardless of the state of the separator. Hereby, the pulling-off of the separator can be promoted by the gas as described above. Further, the gas controlling portion may be configured to control the gas supply portion to blow the gas only before the opposite ends reach the jump position after the restriction on the opposite ends of the separator is relieved. In this case, in comparison with a case where the gas supply portion keeps blowing the gas regardless of the state of the separator, the supply amount of the gas is reduced, thereby making it possible to reduce the cost.

Further, the conveying apparatus may further include: a pedestal portion on which a plurality of separators stacked via respective sealing portions is placed; and a lifting portion configured to move the pedestal portion relative to the restricting portions so that the opposite ends of the separator placed on an uppermost side make contact with the restricting portions.

With this configuration, one separator can be pulled off against the adhesive force or the tacking force, of the sealing portion, that works between two separators adjacent to each other and stacked on the pedestal portion, and the one separator can be conveyed by the conveying portion. Further, the pedestal portion can be moved relative to the restricting portions by the lifting portion after the one separator stacked on the uppermost side is lifted and conveyed by the conveying portion. Hereby, the opposite ends of a subsequent separator to be placed on the uppermost side can be brought into contact with the restricting portions. As such, the separators stacked via the sealing portions can be efficiently lifted and conveyed one by one.

Further, the conveying apparatus according to the above aspect may further include position correcting portions configured to align the opposite ends of the separator with the restricting portions. The position correcting portions may be provided below the restricting portions in the lifting direction of the separator so as to be movable with the restricting portions relative to the pedestal portion. The position correcting portions may include inclined surfaces configured to face the opposite ends of the separator. An interval between the inclined surfaces may be wider than a dimension of the separator in lower ends of the inclined surfaces in the lifting direction and may be gradually narrowed toward upper ends of the inclined surfaces in the lifting direction.

With this configuration, the pedestal portion can be moved relative to the restricting portions and the position correcting portions by the lifting portion, for example. Hereby, the separators stacked on the pedestal portion approach the inclined surfaces facing each other in the position correcting portions from below the position correcting portions and enter between the inclined surfaces facing each other. Further, the pedestal portion is moved by the lifting portion relative to the position correcting portions, so that the separators are moved upward relative to the position correcting portions. Hereby, one end of each of the separators makes contact with a corresponding one of the inclined surfaces.

Here, the interval between the inclined surfaces is wider than the dimension of the separator in the lower ends of the inclined surfaces and is gradually narrowed toward the upper ends thereof in the lifting direction. On this account, when the separators are moved upward along the position correcting portions, the positions of the separators are gradually corrected to a right position. Then, finally, the opposite ends of the separator are aligned with the restricting portions so that the opposite ends of the separator are disposed to make contact with the lower sides of the restricting portions. Hereby, when the separators stacked on the pedestal portion are lifted and conveyed one by one by the conveying portion, the separators can be sequentially aligned with the restricting portions. This can accordingly prevent a poor restriction on the opposite ends of the separator by the restricting portions, thereby making it possible to smoothly lift and convey the separator by the conveying portion.

With this disclosure, it is possible to provide, at a low cost, a conveying apparatus for a fuel cell separator, the conveying apparatus being able to convey a plurality of separators stacked via sealing portions one by one.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following describes an embodiment of a conveying apparatus for a fuel cell separator according to this disclosure with reference to the drawings.

Figure 1:
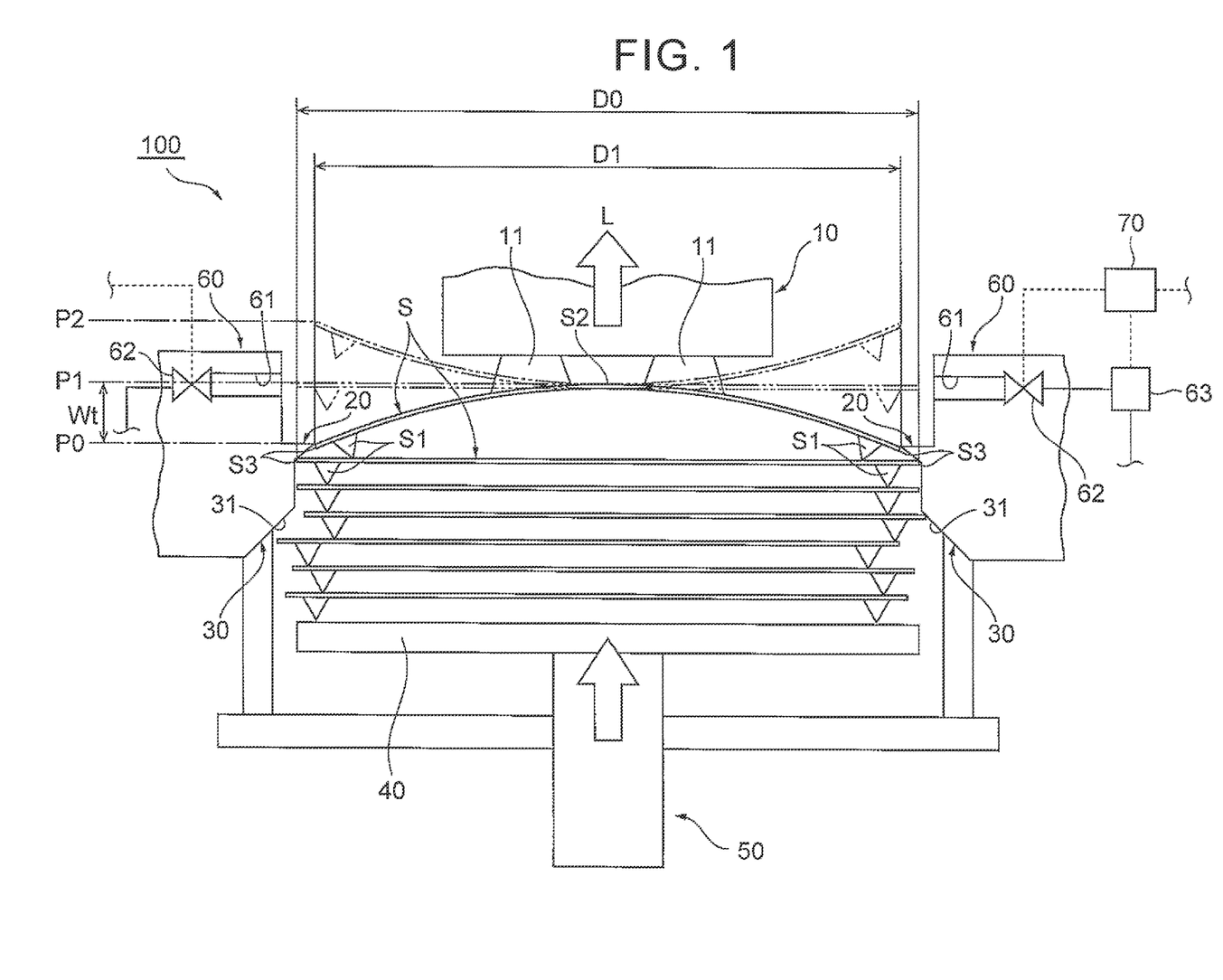
FIG. 1 is a schematic view of a conveying apparatus for a fuel cell separator according to one embodiment of this disclosure.
Figure 2:
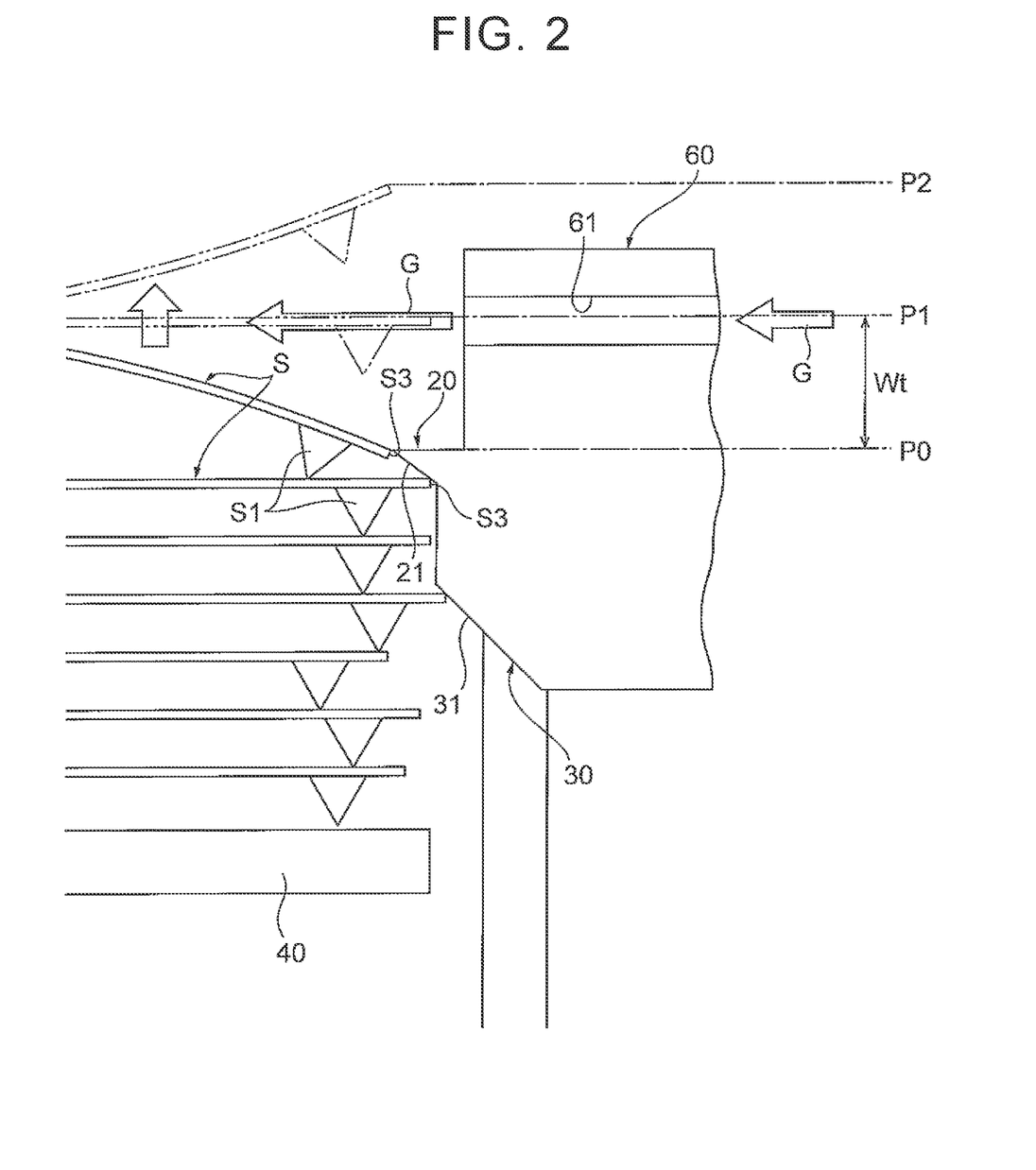
FIG. 2 is an enlarged view of the conveying apparatus, illustrated in FIG. 1.

FIG. 1 is a schematic view of a conveying apparatus 100 for a fuel cell separator (hereinafter just referred to as the conveying apparatus 100) according to one embodiment of this disclosure. FIG. 2 is an enlarged view of the conveying apparatus 100 illustrated in FIG. 1. Although details of the conveying apparatus 100 will be described later, the conveying apparatus 100 of the present embodiment has a feature in the following configuration.

The conveying apparatus 100 conveys a separator S including a sealing portion S1. The conveying apparatus 100 includes a conveying portion 10 and restricting portions 20. The conveying portion 10 holds an intermediate part S2 of one separator S and lifts the one separator S. The restricting portions 20 temporarily restrict opposite ends S3, S3 of the separator S to warp the intermediate part S2 of the separator S toward a lifting direction L when the conveying portion 10 lifts the separator S. The restricting portions 20 are configured to release the opposite ends S3, S3 by relieving the restriction when the intermediate part S2 of the separator S warps in the lifting direction L with a target curvature amount Wt.

The following more specifically describes a configuration of each part of the conveying apparatus 100 according to the present embodiment. The conveying apparatus 100 can include position correcting portions 30, a pedestal portion 40, a lifting portion 50, gas supply portions 60, and a gas controlling portion 70, for example, in addition to the conveying portion 10 and the restricting portions 20.

The separator S for a fuel cell to be conveyed by the conveying apparatus 100 is, for example, a generally rectangular plate-shaped member formed by using, as a material, an elastic body including metal such as stainless steel or titanium. The fuel cell is configured such that a membrane-electrode-gas diffusion layer assembly (MEGA) is disposed between two separators S, for example.

As will be described later, the thickness of the separator S is not particularly limited, provided that the thickness allows the separator S to elastically deform in an arch shape. For example, the separator S with a thickness of about 0.1 [mm] to about 2 [mm] can be used. The thickness of the separator S is generally about 1 [mm]. The separator S includes a sealing portion S1 on at least one surface. Further, the roughness of the surface of one separator S that might make contact with the sealing portion S1 of another separator S when those separators S are stacked via the sealing portion S1 is from about 0.2 [μm] to 3.2 [μm] in terms of an arithmetic mean roughness Ra and is more preferably from about 0.8 [μm] to 1.6 [μm].

The sealing portion S1 is disposed in a peripheral portion of the separator S or around a through-hole provided in the separator S. When a fuel cell stack is formed by stacking a plurality of fuel cells, the sealing portion S1 seals a passage for a reactant gas or a passage for a refrigerant, so as to prevent the leak of the reactant gas or the refrigerant. The material of the sealing portion S1 is resin including rubber such as ethylene propylene diene rubber (EPDM) or silicone rubber, for example.

In a fuel-cell manufacturing process, the separators S may be stacked via the sealing portion S1 in some cases. In this case, respective sealing portions S1 of two separators S, S adjacent to each other make close contact with each other or the sealing portion S1 of one of the two separators S, S makes close contact with a part of the other one of the two separators S, S, the part being other than the sealing portion S1, so that the two separators S, S can be hardly separated from each other. That is, an adhesive force or a tacking force due to the sealing portion S1 is generated between the two separators S, S adjacent to each other, thereby making it difficult for the two separators S, S adjacent to each other to be separated from each other.

The conveying apparatus 100 according to the present embodiment conveys a plurality of separators S stacked via the sealing portions S1 one by one. The conveying apparatus 100 holds the intermediate part S2 of one separator S put on the top of the stacked separators S, by means of the conveying portion 10, for example. More specifically, in a case where the separators S have a generally rectangular plate shape, the conveying portion 10 holds the intermediate part S2 of the one separator S in its longitudinal direction. Here, the intermediate part S2 is a part of the separator S except the opposite ends S3, S3 and includes the central part of the separator S and its vicinity.

The conveying portion 10 is configured to hold the intermediate part S2 of one separator S and lifts the one separator S, as described above. For example, the conveying portion 10 can include vacuum-adsorption portions 11, 11 configured to hold the intermediate part S2 of the separator S by vacuum adsorption, or fingers configured to grip the intermediate part S2 of the separator S.

Note that the configuration of the conveying portion 10 is not particularly limited, provided that the conveying portion 10 can hold the intermediate part S2 of the separator S and can lift and convey the separator S. The lifting direction L of the separator S to be lifted by the conveying portion 10 is the upper side in the vertical direction, for example. In the following description, the upper side and the lower side in the lifting direction L of the separator S may be just referred to as the "upper side" and the "lower side" in some cases.

As described above, the restricting portions 20 are configured to temporarily restrict the opposite ends S3, S3 of the separator S when the separator S is lifted by the conveying portion 10, so that the intermediate part S2 of the separator S warps in the lifting direction L. Further, the restricting portions 20 are configured to release the opposite ends S3, S3 by relieving the restriction on the opposite ends S3, S3 when the intermediate part S2 of the separator S warps in the lifting direction L with the target curvature amount Wt.

Here, the target curvature amount Wt is a distance between a position P0 of the opposite ends S3, S3 of the separator S and a position P1 of the intermediate part S2 in the lifting direction L at the moment when the opposite ends S3, S3 of the separator S warping in an arch shape are released. The restricting portions 20 are provided independently from the conveying portion 10 so as to be separated from the conveying portion 10.

The restricting portions 20 are projections provided to face each other at an interval equivalent to a dimension D1 between the opposite ends S3, S3 of the separator S when the intermediate part S2 of the separator S warps with the target curvature amount Wt. Further, the restricting portions 20 include inclined portions 21 inclined to directions toward the intermediate part S2 from the opposite ends S3, S3 of the separator S as the inclined portions 21 go from the lower side to the upper side in the lifting direction L of the separator S. Hereby, the restricting portions 20 have a triangular or wedge-shaped sectional shape, for example.

Further, a plurality of restricting portions 20 may be disposed at an interval along the edge of each of the opposite ends S3, S3 of the separator S. That is, the restricting portions 20 can be disposed at an interval along the edge extending in the short direction of the separator S. More specifically, two restricting portions 20 can be disposed in each edge extending in the short direction of the separator S, that is, four restricting portions 20 can be disposed in total, for example.

The position correcting portions 30 are configured to align the opposite ends S3, S3 of the separator S with the restricting portions 20. More specifically, the position correcting portions 30 cause respective positions of the opposite ends S3, S3 of the separator S disposed on the upper side and approaching the restricting portions 20, among the separators S stacked via the sealing portions S1, to face respective lower sides of the restricting portions 20, 20 facing each other in the longitudinal direction of the separator S. The position correcting portions 30 are provided below the restricting portions 20 so as to be movable with the restricting portions 20 relative to the pedestal portion 40.

The position correcting portion 30 and the restricting portion 20 can be provided integrally as one member, for example. Further, the position correcting portions 30, 30 include inclined surfaces 31, 31 facing the opposite ends S3, S3 of the separator S. In lower ends of the inclined surfaces 31, 31 in the lifting direction L, the interval between the inclined surfaces 31, 31 facing each other in the longitudinal direction of the separator S is wider than a dimension D0 between the opposite ends S3, S3 of the separator S that does not warp. The interval is gradually narrowed toward upper ends of the inclined surfaces 31, 31 in the lifting direction L.

The pedestal portion 40 is configured such that the separators S stacked via the sealing portions S1 are placed on the pedestal portion 40. The pedestal portion 40 is provided in a frame shape or a plate shape, for example, so as to support the separators S placed on the pedestal portion 40 from the lower side.

The lifting portion 50 is configured to move the pedestal portion 40 relative to the restricting portion 20 so that the opposite ends S3, S3 of the separator S placed on the uppermost side face the restricting portions 20. The lifting portion 50 is constituted by an appropriate linear-motion mechanism including a motor, a speed reducer, a ball screw, a gear, an air cylinder, a hydraulic cylinder, and the like, so that the lifting portion 50 moves the pedestal portion 40 up and down in the vertical direction at a predetermined pitch.

The gas supply portions 60 are configured to blow gas G toward the intermediate part S2 from the outside of the separator S. The gas supply portions 60 are disposed above the restricting portions 20 in the lifting direction L of the separator S to be lifted by the conveying portion 10. The gas supply portions 60 are provided, in the lifting direction L of the separator S, in the vicinity of the position P1 of the intermediate part S2 at the time when the separator S warps with the target curvature amount Wt, for example. Note that the vicinity of the position P1 of the intermediate part S2 is within a range having tolerances of about a few millimeters toward the upper side and the lower side in the lifting direction L of the separator S from the position P1 of the intermediate part S2 as a center, for example.

Further, as will be described later, an uppermost position to which the opposite ends S3, S3 of the separator S jump up when the restriction by the restricting portions 20 is relieved is referred to as a jump position P2. At this time, the gas supply portions 60 are provided between the upper ends of the restricting portions 20 and the jump position P2 of the opposite ends S3, S3 of the separator S in the lifting direction L of the separator S, for example.

The gas supply portion 60 includes, for example, a nozzle 61 opened toward the intermediate part S2 of the separator S in its longitudinal direction, a valve 62 configured to open and close a passage for a Gas G which flows toward the nozzle 61, and a gas pressurization portion 63 configured to supply the pressurized gas G to the gas-G passage that reaches the nozzle 61. The valve 62 is an electromagnetically opening and closing valve and opens and closes the gas-G passage that reaches the nozzle 61 based on a control signal. The gas pressurization portion 63 is constituted by a compressor, a high-pressure tank, a pressure gauge, and so on, for example.

The gas controlling portion 70 is configured to control the blow-off of the gas G by the gas supply portion 60. The gas controlling portion 70 is a computer unit constituted by a central processing unit, a storage device, and so on, for example. The gas controlling portion 70 is connected to the valve 62 and the gas pressurization portion 63 of the gas supply portion 60 via signal wires, and the gas controlling portion 70 is configured to control the blow-off of the gas G from the nozzle 61 by controlling the opening and closing of the valve 62 and the supply of the gas by the gas pressurization portion 63.

The gas controlling portion 70, for example, controls the gas supply portion 60 to blow the gas G at least after the restriction on the opposite ends S3, S3 of the separator S is relieved but before the opposite ends S3, S3 reach the jump position P2. That is, the gas controlling portion 70 may control the gas supply portion to keep blowing the gas G regardless of the state of the separator S. Further, the gas controlling portion 70 may control the gas supply portion 60 to blow the gas G only before the opposite ends S3, S3 of the separator S reach the jump position P2 after the restriction on the opposite ends S3, S3 of the separator S is relieved.

The following describes the operation of the conveying apparatus 100 of the present embodiment.

As described above, the conveying apparatus 100 of the present embodiment conveys the separator S including the sealing portion S1. The conveying apparatus 100 includes the conveying portion 10 and the restricting portions 20. The conveying portion 10 holds the intermediate part S2 of one separator S and lifts the one separator S. The restricting portions 20 restrict the opposite ends S3, S3 of the one separator S to warp the intermediate part S2 of the one separator S in the lifting direction L when the conveying portion 10 lifts the one separator S. The restricting portions 20 are configured to release the opposite ends S3, S3 when the intermediate part S2 of the one separator S warps in the lifting direction L with the target curvature amount Wt.

As described above, the conveying apparatus 100 of the present embodiment conveys a plurality of separators S stacked via the sealing portions S1 one by one, for example, as described above. More specifically, the conveying apparatus 100 first holds the intermediate part S2 of one separator S placed on the top of the stacked separators S, by means of the conveying portion 10. Then, the intermediate part S2 of the one separator S is lifted by the conveying portion 10. At this time, the opposite ends S3, S3 of the one separator S are restricted by the restricting portions 20.

Hereby, in a state where the opposite ends S3, S3 of the one separator S are restricted by the restricting portions 20, only the intermediate part S2 of the one separator S is lifted upward by the conveying portion 10. As a result, the one separator S curves to project upward so that the one separator S warps to bend into an arch shape within an elastic range. After that, when the intermediate part S2 of the one separator S warps with the target curvature amount Wt, the restriction on the opposite ends S3, S3 by the restricting portions 20 is relieved. Consequently, the opposite ends S3, S3 of the one separator S jump upward due to the elasticity of the separator S.

In this way, one separator S can be pulled off against the adhesive force or the tacking force of the sealing portion S1 and conveyed by the conveying portion 10. Further, at the time of pulling off one separator S, it is not necessary to supply the gas G such as the air or other gases or it is possible to markedly reduce the supply amount of the gas G as compared with the conveying apparatus of JP 2007-115600 A. On this account, in comparison with the conveying method of JP 2007-115600 A, it is possible to largely reduce the cost.

Further, in the conveying apparatus 100 according to the present embodiment, the restricting portions 20 are projections provided to face each other at an interval equivalent to the dimension D1 between the opposite ends S3, S3 of the separator S when the intermediate part S2 of the separator S warps with the target curvature amount Wt.

With this configuration, the restricting portions 20 temporarily restrict the opposite ends S3, S3 of the separator S to warp the intermediate part S2 of the separator S upward when the conveying portion 10 lifts the separator S. Further, with this configuration, the restricting portions 20 can release the opposite ends S3, S3 by relieving the restriction on the opposite ends S3, S3 when the intermediate part S2 of the separator S warps upward with the target curvature amount Wt.

More specifically, the interval between the restricting portions 20, 20 facing each other in the longitudinal direction of the separator S is narrower than the dimension D0 between the opposite ends S3, S3 of the separator S in a state where the intermediate part S2 of the separator S is not lifted by the conveying portion 10 and the separator S does not warp. On this account, when the restricting portions 20 are disposed above the separator S, the restricting portions 20 face the opposite ends S3, S3 of the separator S in the lifting direction L of the separator S.

In this state, when the intermediate part S2 of the separator S is held by the conveying portion 10 and the separator S is lifted, the opposite ends S3, S3 of the separator S are temporarily restricted by the restricting portions 20, so that the intermediate part S2 of the separator S warps upward. When the intermediate part S2 of the separator S is further lifted by the conveying portion 10, the warp of the separator S the opposite ends S3, S3 of which are restricted by the restricting portions 20 increases. At the same time, the dimension D0 between the opposite ends S3, S3 of the separator S gradually decreases.

Then, when the intermediate part S2 of the separator S warps upward with the target curvature amount Wt, the dimension D1 between the opposite ends S3, S3 of the separator S is equivalent to the interval between the restricting portions 20. This allows the separator S to pass through between the restricting portions 20 facing each other, so that the restriction on the opposite ends S3, S3 of the separator S by the restricting portions 20 is relieved. When the opposite ends S3, S3 of the separator S warping in an arch shape are released, the opposite ends S3, S3 of the separator S jump upward. In this way, one separator S can be pulled off against the adhesive force or the tacking force of the sealing portion S1 and conveyed by the conveying portion 10.

Note that the target curvature amount Wt with which the intermediate part S2 of the separator S is held and warped by the conveying portion 10 is set to a curvature amount that allows one separator S to be pulled off against the adhesive force or the tacking force of the sealing portion S1 when the opposite ends S3, S3 of the separator S are released to jump up. That is, in a case where one separator S does not warp so much, when the opposite ends S3, S3 of the one separator S are released to jump up, only the one separator S might not be pulled off.

In the meantime, in a case where the separator S warps too much, the separator S might be damaged, or lifting or conveying of the separator S by the conveying portion 10 might be difficult. On this account, the target curvature amount Wt with which the intermediate part S2 of one separator S warps can be set to a position at which the intermediate part S2 can warp appropriately so that the one separator S can be pulled off against the adhesive force or the tacking force of the sealing portion S1 when the opposite ends S3, S3 of the one separator S jump up.

Further, in the conveying apparatus 100 according to the present embodiment, the restricting portions 20 as projections include the inclined portions 21 inclined to the directions toward the intermediate part S2 from the opposite ends S3, S3 of the separator S as the inclined portions 21 go from the lower side to the upper side in the lifting direction L of the separator S.

With this configuration, it is possible to easily warp the separator S with the opposite ends S3, S3 of which are restricted by the restricting portions 20, to prevent the damage on the separator S, and to smoothly relieve the restriction on the opposite ends S3, S3 of the separator S. That is, in a case where the restricting portions 20 do not include the inclined portions 21, when the intermediate part S2 of the separator S is lifted, the restricting portions 20 might restrict the opposite ends S3, S3 excessively, bite into the opposite ends S3, S3, or prevent the release of the opposite ends S3, S3, depending on the shape of the restricting portions 20 as projections. On the other hand, when the restricting portions 20 include the inclined portions 21, it is possible to restrain such a trouble.

Further, the conveying apparatus 100 according to the present embodiment includes the gas supply portions 60 configured to blow the gas G toward the intermediate part S2 from the outside of the separator S. The gas supply portions 60 are disposed above the restricting portions 20 in the lifting direction L of the separator S to be lifted by the conveying portion 10.

With this configuration, when the opposite ends S3, S3 of the separator S warping in an arch shape are released from the restriction of the restricting portions 20 and the opposite ends S3, S3 of the separator S jump upward, the gas G can be blown into the lower side of the separator S. Hereby, the pulling-off of the separator S by the jump of the opposite ends S3, S3 of the separator S can be assisted, promoted, and facilitated by the gas G.

Accordingly, the target curvature amount Wt to warp the intermediate part S2 of the separator S can be reduced, the warp of the separator S can be reduced, the load to the conveying portion 10 can be reduced, and the damage to the separator S can be restrained. Further, the supply of the gas G by the gas supply portion 60 is to assist, promote, and facilitate the pulling-off of the separator S by the jump of the opposite ends S3, S3 of the separator S. On this account, in comparison with a case where adjacent separators are separated from each other by just supplying a medium such as the air or other gases like the conveying apparatus described in JP 2007-115600 A, it is possible to largely reduce the supply amount of the gas G and to reduce the cost.

Further, in the conveying apparatus 100 of the present embodiment, the gas supply portions 60 are provided, in the lifting direction L of the separator S, in the vicinity of the position of the intermediate part S2 at the time when the intermediate part S2 warps with the target curvature amount Wt.

With this configuration, the gas supply portions 60 can be disposed below, in the lifting direction L of the separator S, the position of the opposite ends S3, S3 of the separator S that the opposite ends S3, S3 of the separator S warping in an arch shape jump up to reach when the opposite ends S3, S3 are released from the restriction of the restricting portions 20. Hereby, it is possible to more surely blow the gas G to the lower surface of the separator S when the opposite ends S3, S3 of the separator S jump upward in the lifting direction L of the separator S.

Further, in the conveying apparatus 100 of the present embodiment, in terms of the lifting direction L of the separator S, the gas supply portions 60 are provided between the upper ends of the restricting portions 20 and the jump position P2 to which the opposite ends S3, S3 of the separator S jump up when the restriction on the opposite ends S3, S3 by the restricting portions 20 is relieved.

With this configuration, the gas supply portions 60 can be disposed below, in the lifting direction L of the separator S, the jump position P2 of the opposite ends S3, S3 of the separator S when the opposite ends S3, S3 of the separator S warping in an arch shape are released from the restriction of the restricting portions 20, 20. Hereby, it is possible to more surely blow the gas G to the lower surface of the separator S when the opposite ends S3, S3 of the separator S jump upward in the lifting direction L of the separator S.

Further, the conveying apparatus 100 of the present embodiment includes the gas controlling portion 70 configured to control the blow-off of the gas G by the gas supply portion 60. The gas controlling portion 70 controls the gas supply portion 60 to blow the gas G at least after the restriction on the opposite ends S3, S3 of the separator S is relieved but before the opposite ends S3, S3 of the separator S reach the jump position P2.

The gas controlling portion 70 may control the gas supply portion 60 to keep blowing the gas regardless of the state of the separator S. In this case, the pulling-off of the separator S can be promoted by the gas G. Further, the gas controlling portion 70 may control the gas supply portion 60 to blow the gas G only before the opposite ends S3, S3 of the separator S reach the jump position P2 after the restriction on the opposite ends S3, S3 of the separator S is relieved. In this case, in comparison with a case where the gas supply portion 60 keeps blowing the gas regardless of the state of the separator, it is possible to reduce the supply amount of the gas G and to reduce the cost.

Further, the conveying apparatus 100 of the present embodiment includes the pedestal portion 40 on which the separators S stacked via the sealing portions S1 are placed, and the lifting portion 50 configured to move the pedestal portion 40 relative to the restricting portions 20 so that the opposite ends S3, S3 of the separator S placed on the uppermost side make contact with the restricting portions 20, 20.

With this configuration, one separator S can be pulled off against the adhesive force or the tacking force generated by the sealing portion S1 to work between two adjacent separators S, S stacked on the pedestal portion 40 and can be conveyed by the conveying portion 10. Further, the pedestal portion 40 can be moved relative to the restricting portions 20 by the lifting portion 50 after the one separator S stacked on the top of the separators S is lifted and conveyed by the conveying portion 10. Hereby, the opposite ends S3, S3 of a subsequent separator S to be placed on the uppermost side can be brought into contact with the restricting portions 20, 20. As such, the separators S stacked via the sealing portions S1 can be efficiently lifted and conveyed one by one.

Further, the conveying apparatus 100 of the present embodiment includes the position correcting portions 30 configured to align the opposite ends S3, S3 of the separator S with the restricting portions 20. The position correcting portions 30 are provided below the restricting portions 20 in the lifting direction of the separator S so as to be movable with the restricting portions 20 relative to the pedestal portion 40, and the position correcting portions 30 include the inclined surfaces 31 configured to face the opposite ends S3, S3 of the separator S. The interval between the inclined surfaces 31 is wider than the dimension D0 of the separator S in the lower ends of the inclined surfaces 31 in the lifting direction L and is gradually narrowed toward the upper ends thereof in the lifting direction L.

With this configuration, the pedestal portion 40 can be moved relative to the restricting portions 20 and the position correcting portions 30 by the lifting portion 50, for example. Hereby, the separators S stacked on the pedestal portion 40 approach the inclined surfaces 31 facing each other in the position correcting portions 30 from below the position correcting portions 30 and enter between the inclined surfaces 31 facing each other. Further, the pedestal portion 40 is moved by the lifting portion 50 relative to the position correcting portions 30, so that the separators S are moved upward to the position correcting portions 30. As a result, one end S3 of each of the separators S makes contact with a corresponding one of the inclined surfaces 31.

Here, the interval between the inclined surfaces 31 is wider than the dimension D0 of the separator S in the lower ends of the inclined surfaces 31 and is gradually narrowed toward the upper ends thereof in the lifting direction L. On this account, when the separators S are moved upward along the position correcting portions 30, the positions of the separators S are gradually corrected to a right position. Then, finally, the opposite ends S3, S3 of the separator S are aligned with the restricting portions 20, 20 so that the opposite ends S3, S3 of the separator S are disposed to face the lower sides of the restricting portions 20, 20. Hereby, when the separators S stacked on the pedestal portion 40 are lifted and conveyed one by one by the conveying portion 10, the separators S can be sequentially aligned with the restricting portions 20. This can accordingly prevent a poor restriction on the opposite ends S3, S3 of the separator S by the restricting portions 20, 20, thereby making it possible to smoothly lift and convey the separator S by the conveying portion 10.

As described above, with the present embodiment, it is possible to provide, at a low cost, the conveying apparatus 100 that can convey the separators S stacked via the sealing portions S1 one by one.

The details of the embodiment of the conveying apparatus according to this disclosure have been described above with reference to the drawings. However, concrete configurations of the conveying apparatus are not limited to the above embodiment, and even if there are changes of design or the like within a range that does not deviate from a gist of the disclosure, they are included in this disclosure.

For example, the conveying apparatus according to this disclosure is not limited to the configuration in which the restricting portions are projections. More specifically, the restricting portions may be an openable gripper configured to restrict and release the opposite ends of the separator by opening and closing. Further, the restricting portions may be retractable detent portions or fingers configured to restrict and release the opposite ends of the separator by advancing and retreating with respect to the opposite ends of the separator. As such, even if the restricting portions are not projections, the restricting portions can temporarily restrict the opposite ends of the separator so as to warp the separator, and when the intermediate part of the separator warps with a target curvature amount, the restricting portions can release the opposite ends.

EXAMPLES

The following describes examples of experiment on the conveying apparatus according to this disclosure.

Figure 3:
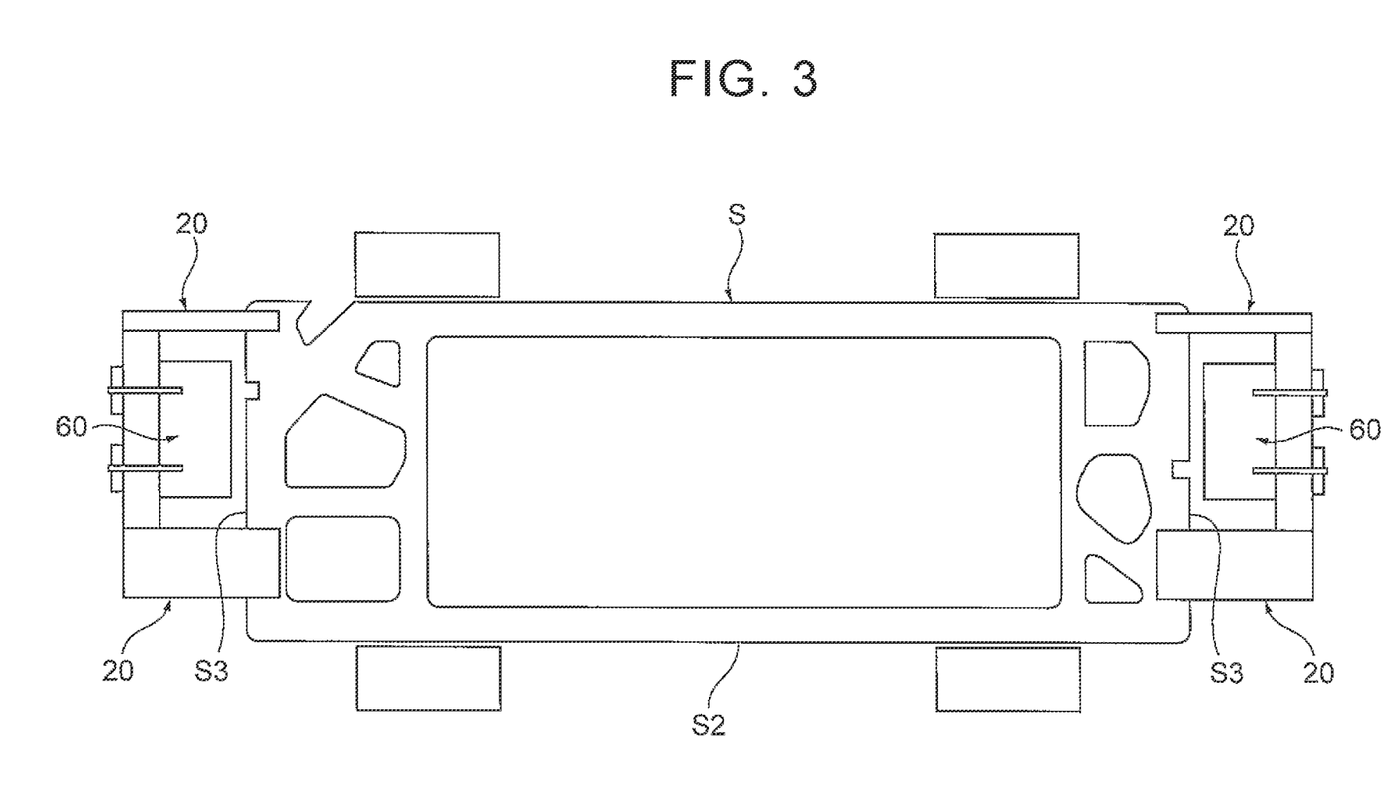
FIG. 3 is a plan view to describe examples of experiment on the conveying apparatus according to this disclosure.
Figure 4:
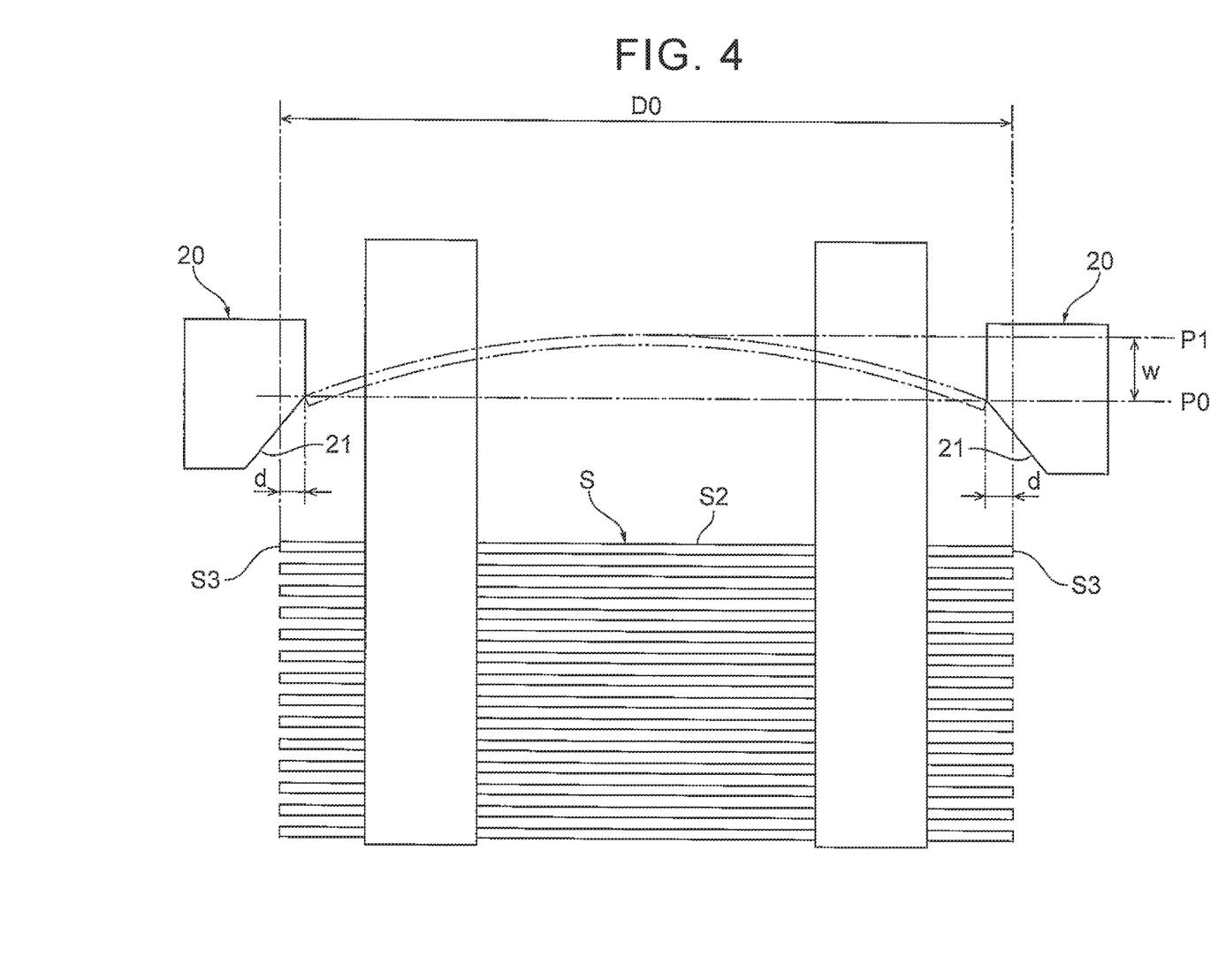
FIG. 4 is a schematic side view of the conveying apparatus illustrated in FIG. 3.

FIG. 3 is a schematic plan view to describe examples of experiment on the conveying apparatus according to this disclosure. FIG. 4 is a schematic side view of the conveying apparatus illustrated in FIG. 3.

In the examples of experiment, the same configuration as the conveying apparatus 100 in the above embodiment has the same reference sign as in the above embodiment, and descriptions thereof are omitted. Further, in FIGS. 3 and 4, the conveying portion, the pedestal portion, and the lifting portion are omitted.

The separator S was constituted by two titanium plates having a thickness of 0.1 [mm] (subjected to press working with a thickness of 0.35 [mm]) and polyethylene terephthalate (PET) resin having a thickness of 0.3 [mm].

Then, three samples N1 to N3 of the separator S were prepared and subjected to an experiment to examine an optimum target curvature amount Wt to warp the separator S in such a manner that the interval between the restricting portions 20 was changed and the intermediate part S2 of the separator S was lifted by the conveying portion. Experimental results are shown in TABLE 1. Note that, in TABLE 1, a horizontal distance between the end S3 of the separator S and the end of the restricting portion 20 is regarded as a driven amount d. Further, the distance between the position P0 of the opposite ends S3, S3 and the position P1 of the intermediate part S2 in the lifting direction L at the moment when the opposite ends S3, S3 of the separator S warping in an arch shape are relieved is regarded as a curvature amount w of the separator S.

TABLE 1

| DRIVEN AMOUNT | CURVATURE AMOUNT w [mm] | | | |
|---|---|---|---|---|
| d [mm] | N1 | N2 | N3 | CRACK |
| 0.3 | 0 | 0 | 0 | NO CRACK |
| 0.8 | 7 | 7 | 7 | NO CRACK |
| 1.8 | 10 | 10 | 11 | NO CRACK |
| 2.3 | 13 | 12 | 13 | NO CRACK |
| 2.8 | 19 | 19 | 19 | NO CRACK |
| 3.3 | 17 | 17 | 18 | NO CRACK |
| 3.8 | 16 | 15 | 16 | NO CRACK |
| 4.3 | 17 | 17 | 17 | NO CRACK |
| 4.8 | 19 | 20 | 20 | NO CRACK |
| 5.3 | 21 | 20 | 20 | NO CRACK |
| 5.8 | 23 | 23 | 23 | NO CRACK |
| 6.3 | 25 | 25 | 26 | NO CRACK |
| 6.8 | 25 | 26 | 26 | NO CRACK |
| 7.3 | 27 | 27 | 27 | NO CRACK |
| 7.8 | 29 | 29 | 28 | NO CRACK |
| 8.3 | 30 | 30 | 30 | NO CRACK |
| 8.8 | 31 | 32 | 32 | CRACK |

In the examples of experiment, when the curvature amount w exceeded 30 [mm], a crack was observed in the separator S. Further, when the curvature amount w was in a range of not less than 19 [mm] but not more than 30 [mm], the separators S could be pulled off and conveyed one by one against the adhesive force or the tacking force by the sealing portion S1. Accordingly, in the examples of experiment, the target curvature amount Wt can be set to the range of not less than 19 [mm] but not more than 30 [mm]. Hereby, it is possible to provide, at a low cost, a conveying apparatus for a fuel cell separator, the conveying apparatus being able to convey a plurality of separators S stacked via sealing portions S1 one by one.

What is claimed is:

1. A conveying apparatus for conveying a separator for a fuel cell, the separator including a sealing portion, the conveying apparatus comprising:
    a conveying portion configured to hold an intermediate part of one separator and lifts the one separator; and
    restricting portions configured to restrict opposite ends of the one separator to warp the intermediate part of the one separator in a lifting direction when the one separator is lifted by the conveying portion, wherein
    the restricting portions are configured to release the opposite ends when the intermediate part of the one separator warps in the lifting direction with a target curvature amount;
    further comprising a gas supply portion configured to blow gas toward the intermediate part from an outside of a plurality of stacked separators, wherein the gas supply portion is disposed above the restricting portions in the lifting direction of the one separator to be lifted by the conveying portion.

2. The conveying apparatus according to claim 1, wherein the gas supply portion is provided, in the lifting direction of the one separator, in a vicinity of a position of the intermediate part at a time when the intermediate part warps with the target curvature amount.

3. The conveying apparatus according to claim 1, wherein, in terms of the lifting direction of the one separator, the gas supply portion is provided between upper ends of the restricting portions and a jump position to which the opposite ends of the one separator jump up when restriction on the opposite ends is relieved.

4. The conveying apparatus according to claim 3, further comprising a gas controlling portion configured to control blow-off of the gas by the gas supply portion, wherein the gas controlling portion is configured to control the gas supply portion to blow the gas at least after the restriction on the opposite ends of the one separator is relieved but before the opposite ends reach the jump position.

\* \* \* \* \*